United States Patent [19]

Fuchs et al.

[11] Patent Number: 4,737,354
[45] Date of Patent: Apr. 12, 1988

[54] PREPARATION OF HYDROXYLAMINE-O-SULFONIC ACID

[75] Inventors: Hugo Fuchs, Ludwigshafen; Franz-Josef Weiss, Neuhofen; Erwin Thomas, Freinsheim; Josef Ritz, Ludwigshafen, all of Fed. Rep. of Germany

[73] Assignee: BASF Aktiengesellschaft, Ludwigshafen, Fed. Rep. of Germany

[21] Appl. No.: 8,343

[22] Filed: Jan. 29, 1987

[30] Foreign Application Priority Data

Jan. 17, 1986 [DE] Fed. Rep. of Germany ....... 3601217

[51] Int. Cl.$^4$ ...................... C01B 21/00; C01B 21/54
[52] U.S. Cl. ................................................. 423/388
[58] Field of Search ...................... 423/387, 388, 389

[56] References Cited

U.S. PATENT DOCUMENTS

| 2,862,790 | 12/1958 | Pierce | 423/389 |
|---|---|---|---|
| 3,281,209 | 10/1966 | Wehrmeister et al. | 423/388 |
| 3,416,886 | 12/1968 | Capaul et al. | 423/388 |
| 3,607,032 | 9/1971 | Kalz et al. | 423/388 |

FOREIGN PATENT DOCUMENTS

| 149400 | 11/1979 | Japan | 423/388 |
|---|---|---|---|
| 155008 | 12/1981 | Japan | 423/388 |

OTHER PUBLICATIONS

Z. Anorg. Allg. Chem. 147 (1925).
Chem. Ber. 92 (1959).

*Primary Examiner*—John Doll
*Assistant Examiner*—Wayne A. Langel
*Attorney, Agent, or Firm*—Keil & Weinkauf

[57] ABSTRACT

Hydroxylamine-O-sulfonic acid is prepared by
(a) reacting hydroxylammonium sulfate with oleum at elevated temperatures,
(b) isolating sulfuric acid from the hydroxylamine-O-sulfonic acid formed,
(c) diluting the sulfuric acid which was obtained in stage (b) and which still contains hydroxylamino-O-sulfonic acid with water to 2–6N and heating it to 30°–80° C. for 1–10 hours,
(d) preparing hydroxylamine by catalytic reduction of nitrogen monoxide with hydrogen using the dilute sulfuric acid from stage (c) in the presence of a noble metal catalyst at elevated temperatures.

2 Claims, No Drawings

PREPARATION OF HYDROXYLAMINE-O-SULFONIC ACID

The present invention relates to a process for preparing hydroxylamine-O-sulfonic acid by reacting hydroxylammonium sulfate with oleum.

Z. Anorg. Allg. Chem. 147 (1925), 143, discloses a process for preparing hydroxylamine-O-sulfonic acid by reacting hydroxylammonium sulfate with chlorosulfonic acid. This process is disadvantageous insofar as chlorosulfonic acid is an expensive chemical and, what is more, hydrogen chloride is formed as a byproduct and must be disposed of. Chem. Ber.92 (1959), 2526, describes a process wherein hydroxylamine-O-sulfonic acid is obtained by reacting hydroxylammonium sulfate with oleum. However, the sulfuric acid removed still contains considerable amounts of hydroxylamine-O-sulfonic acid, which cannot be recovered. In addition, the sulfuric acid thus contaminated must be disposed of.

It is an object of the present invention to provide a process for preparing hydroxylamine-O-sulfonic acid which does not produce inconvenient byproducts which must be disposed of and which, in addition, makes the hitherto unrecoverable hydroxylamine-O-sulfonic acid available for further use.

We have found that this object is achieved with a process for preparing hydroxylamine-O-sulfonic acid by reacting hydroxylammonium sulfate with oleum at elevated temperatures, which comprises (a) reacting hydroxylammonium sulfate with oleum at elevated temperatures,
(b) isolating sulfuric acid from the hydroxylamine-O-sulfonic acid formed,
(c) diluting the isolated sulfuric acid which still contains hydroxylamine-O-sulfonic acid with water to 2-6 N and heating it to 30°-80° C. for 1-10 hours,
(d) preparing hydroxylammonium sulfate by catalytic reduction of nitrogen monoxide with hydrogen using the dilute sulfuric acid from stage (c) in the presence of suspended supported platinum catalysts at elevated temperatures.

The novel process has the advantage that no inconvenient byproducts, such as hydrochloric acid or contaminated sulfuric acid, need be disposed off. In addition the novel process has the advantage that even the hydroxylamine-O-sulfonic acid dissolved in the sulfuric acid is utilized.

The novel process is remarkable insofar as the presence of hydroxylamine-O-sulfonic acid in the sulfuric acid used in the sensitive catalytic reduction of nitrogen monoxide with hydrogen to hydroxylammonium sulfate has no adverse effect.

The starting material used is solid hydroxylammonium sulfate. Advantageously the hydroxylammonium sulfate used has a water content of less than 1% by weight. The particle size of the hydroxylammonium sulfate is advantageously 0.5-2 mm. The oleum used for the reaction advantageously contains from 24 to 35% by weight of $SO_3$. In general, from 3 to 6 parts by weight of oleum are employed per part by weight of hydroxylammonium sulfate. Advantageously the reaction is carried out at 90°-140° C., in particular 100°-130° C. After the reaction has ended, the reaction mixture is conveniently cooled to room temperature, for example 15°-25° C.

In the next stage (b), the hydroxylamine-O-sulfonic acid precipitated from the reaction mixture is separated from the remaining sulfuric acid. This is conveniently done in a conventional manner, for example by centrifuging or filtering with suction. The hydroxylamine-O-sulfonic acid thus obtained is advantageously washed with glacial acetic acid and dried under reduced pressure. The remaining sulfuric acid in the filtrate generally still contains from 0.5 to 5% by weight of hydroxylamine-O-sulfonic acid.

In the subsequent stage (c) the sulfuric acid obtained in (b), which still contains hydroxylamine-O-sulfonic acid, is diluted with water to 2-6 N, in particular 3-4.5 N, and heated to 30°-80° C. for 1-10 hours, during which the hydroxylamine-O-sulfonic acid hydrolyzes to hydroxylammonium hydrogensulfate.

The dilute sulfuric acid obtained in stage (c), which still contains traces of hydroxylamine-O-sulfonic acid, is used for preparing hydroxylammonium sulfate by catalytically reducing nitrogen monoxide with hydrogen. In general, hydrogen and nitrogen monoxide are used in a molar ratio of from 1.5:1 to 6:1. The mineral acid used is the dilute sulfuric acid obtained in stage (c), which additionally contains traces of hydroxylamine-O-sulfonic acid, with or without further 4-6 N aqueous sulfuric acid, and in the course of the reaction the acid concentration is allowed to drop, for example down to 0.2 N.

The reaction is advantageously carried out at 30°-60° C. under atmospheric pressure or superatmospheric pressure, for example up to 300 bar.

The noble metal catalyst used is advantageously a platinum catalyst of the type generally employed in supported form. A particularly useful catalyst is platinum on carbon, in particular on graphite. The catalyst is employed in finely divided form as a suspension. Preferably a catalyst of this type contains from 0.2 to 4.0% by weight of platinum. Advantageously the catalyst additionally contains one or more elements of groups V and/or VI of the Periodic Table having an atomic weight >31, e.g. lead and/or mercury.

The resulting aqueous solution of hydroxylammonium sulfate is expediently evaporated under reduced pressure to leave crystalline hydroxylammonium sulfate, which is recycled to stage (a).

The hydroxylamine-O-sulfonic acid obtainable by the process of the invention is suitable for reacting carbonyl compounds, for preparing hydrazines and for use as a polymerization catalyst.

The process of the invention is illustrated in the following Example:

EXAMPLE

Preparation of hydroxylamine-O-sulfonic acid

A 1 l 4-neck flask equipped with a stirrer, thermometer, dropping funnel and a solids dispensing screw is charged with 50 g of 27% (m/m) oleum. 940 g of 27% (m/m) oleum and 250 g of solid hydroxylammonium sulfate are then simultaneously metered in with stirring in the course of 20 minutes, while the temperature is maintained at about 110° C. After the reactants have been added, stirring is continued at that temperature for an hour. The reaction mixture is then cooled down to room temperature, and excess sulfuric acid is removed by centrifuging to give 337 g of a crude acid having a hydroxylamine-O-sulfonic acid content of 90.3%.

Washing with 750 ml of glacial acetic acid leaves 298 g of a 99.9% pure acid. The acid is stored under carefully dried nitrogen.

The sulfuric acid obtained in the preparation of the crude acid still contains about 13 g of hydroxylamine-O-sulfonic acid and is diluted with water to a sulfuric acid content of 20% (m/m) and held at 50° C. for 3 hours, while the hydroxylamine-O-sulfonic acid hydrolyzes back to hydroxylammonium hydrogensulfate. After this treatment the sulfuric acid is then used in the synthesis of hydroxylamine by the catalytic NO hydrogenation method. The space-time yield and the selectivity of the hydroxylamine synthesis using the sulfuric acid from the hydroxylamine-O-sulfonic acid preparation does not differ from the synthesis using pure sulfuric acid, as the following values show:

|  | NH$_2$OH yield mol % | STY* mol of NO/l RS.h** |
|---|---|---|
| Use of pure sulfuric acid | 89.7 | 0.40 |
| Use of sulfuric acid from the hydroxylamine-O—sulfonic acid synthesis | 91.2 | 0.39 |

*space-time yield
**reaction space

We claim:
1. A process for preparing hydroxylamine-O-sulfonic acid by
   (a) reacting hydroxylammonium sulfate with oleum at elevated temperatures,
   (b) isolating sulfuric acid from the hydroxylamine-O-sulfonic acid formed,
   (c) diluting the sulfuric acid which was obtained in stage (b) and which still contains hydroxylamine-0-sulfonic acid with water to 2–6 N and heating it to 30°–80° C. for 1–10 hours,
   (d) preparing hydroxylammonium sulfate by catalytic reduction of nitrogen monoxide with hydrogen using the dilute sulfuric acid from stage (c) in the presence of a noble metal catalyst at elevated temperatures.
2. A process as claimed in claim 1, wherein the hydroxylammonium sulfate produced is reused in stage (a) for preparing hydroxylamine-O-sulfonic acid.

* * * * *